United States Patent [19]
Blahut et al.

[11] Patent Number: 5,463,728
[45] Date of Patent: Oct. 31, 1995

[54] ELECTRONIC CIRCUITS FOR THE GRAPHICAL DISPLAY OF OVERLAPPING WINDOWS WITH TRANSPARENCY

[75] Inventors: Donald E. Blahut, Holmdel; Edward S. Szurkowski, Maplewood, both of N.J.

[73] Assignee: AT&T Corp., Murray Hill, N.J.

[21] Appl. No.: 403,535

[22] Filed: Mar. 14, 1995

Related U.S. Application Data

[63] Continuation of Ser. No. 29,205, Mar. 10, 1993, abandoned.
[51] Int. Cl.$^6$ .............................. G06F 9/38; G06F 3/153
[52] U.S. Cl. .......................... 395/158; 395/157; 395/161
[58] Field of Search .................................. 395/140, 157, 395/158, 135, 161, 126, 131; 364/200

[56] References Cited

U.S. PATENT DOCUMENTS

| | | | |
|---|---|---|---|
| 4,197,590 | 4/1980 | Sukonick | 364/900 |
| 4,414,628 | 11/1983 | Ahuja et al. | 364/200 |
| 4,555,775 | 11/1985 | Pike | 364/900 |
| 4,622,545 | 11/1986 | Atkinson | 340/747 |
| 4,700,320 | 10/1987 | Kapur | 364/521 |
| 4,868,765 | 9/1989 | Diefendorff | 395/157 |
| 4,893,116 | 1/1990 | Henderson et al. | 395/131 X |
| 4,914,607 | 4/1990 | Takanaski et al. | 395/158 X |
| 5,056,041 | 10/1991 | Guttag et al. | 395/158 X |
| 5,150,457 | 9/1992 | Behm et al. | 395/120 X |
| 5,185,808 | 2/1993 | Cok | 395/135 X |
| 5,222,203 | 6/1993 | Obata | 395/126 |

FOREIGN PATENT DOCUMENTS

| | | |
|---|---|---|
| 0280582 | 8/1988 | European Pat. Off. . |
| 0344082 | 11/1989 | European Pat. Off. . |

OTHER PUBLICATIONS

Mastering Windows 3.1 (Trademark of Microsoft Corporation) pp. 367–368, 481.
Research Disclosure, Mar. 1993 (RD 347065), Feb. 20, 1993, p. 206.
R. Pike, "Graphics in Overlapping Bitmap Layers", ACM Transactions on Graphics, vol. 2, No. 2, Apr. 1983, pp. 135–160.
S. McGeady, "Next-Generation Hardware for Windowed Displays", USENIX Technical Conference Proceedings, Winter 1986, pp. 11–22.

*Primary Examiner*—Heather R. Herndon
*Assistant Examiner*—Cliff Nguyen Vo
*Attorney, Agent, or Firm*—Kenneth M. Brown

[57] ABSTRACT

A method and apparatus for the coding and efficient display of overlapping windows with transparency. Each pixel within a window which is not to be displayed may be coded as a "transparent" pixel. The method identifies those pixels which have been coded as transparent and displays non-transparent pixels contained in windows of lower display priority in place of the transparent pixels contained in windows of higher display priority. A pixel coded as transparent may have associated with it an integer representative of the number of successive pixels in the window which are also transparent. A pixel may be coded as transparent by assigning to it a preselected data value which is distinct from values otherwise used to indicate, e.g., the color and/or intensity for each displayed pixel. The method and apparatus may include one or more windows which contain full motion video (i.e., television) images, each of which may also contain transparent pixels. A pixel also may be coded as a "translucent" pixel, whereby a combination of the translucent pixel and a non-translucent pixel contained in a window of lower display priority is displayed. The method may be used to efficiently recognize various conditions in the displayed image, including the collision of objects and the pointing of a displayed cursor to identified "hot spots."

13 Claims, 7 Drawing Sheets

ELECTRONIC CIRCUITS FOR THE GRAPHICAL DISPLAY OF OVERLAPPING WINDOWS WITH TRANSPARENCY

This application is a continuation of application Ser. No. 08/029205, filed on Mar. 10, 1993, now abandoned.

FIELD OF THE INVENTION

The present invention relates generally to video display systems and more specifically to display systems in which a plurality of independent, overlapping windows of display data may be simultaneously displayed.

BACKGROUND OF THE INVENTION

Computer terminal and digital television display systems commonly employ a technique known as "bitmapped" graphics. A "bitmap" is a storage array of bits ("1s" and "0s") corresponding to the intensity and/or color pattern to be displayed at the various locations on a display screen. A display system uses these bits to properly modulate the electron beam of the cathode ray tube, thereby displaying a desired image. Most commonly, these bits are stored in memory as an array, ordered in a left to right sequence within a top to bottom sequence (sometimes referred to as a raster scan order). As the display screen is scanned by the electron beam one horizontal line at a time from top to bottom (and from left to right within each horizontal scan line), the bitmap data can be readily accessed sequentially. Changes in the displayed image are accomplished by changing the data in the bitmap. The display system then displays changed data on subsequent scans of the display device.

Display systems in which a plurality of independent sets of information are displayed concurrently on one display device, each set in its own individual "window," are well known. In the case of computer-based video display systems, each set of information (i.e., the contents of each window) is often associated with an individual program executing in a multi-tasking computer system. Thus, a computer user can simultaneously execute multiple applications and may view the activity of, or otherwise interact with, each of these programs concurrently. In television systems, one or more of the windows may contain video image displays. For example, several such television pictures may be "tiled" on a single television screen, allowing the viewer to watch two or more programs concurrently.

In both the computer display and television examples each window may be independently located within the overall display area. Information to be displayed in each of the windows typically consists of a set of information elements (pixels) arranged in a field of arbitrary, rectangular dimensions. Furthermore, the information in each such window may be either periodically or continually updated, whereupon the display system re-displays the updated information as necessary. This re-display is achieved by the repetitive scanning of the display device, typically a cathode ray tube (CRT). On each scan, the current pixel data of each window is displayed at the appropriate location in the display area.

The concept of visually "overlapping" windows is also well known. Where windows overlap, one window may appear to be in front of another window. As such, the windows in front partially or wholly obscure the visibility of the windows in back. For example, in television systems one or more of the video images may be imbedded in others (a technique commonly known as "picture-in-picture"). To achieve the appearance of overlapping windows, all windows are ordered in a display priority. Wherever more than one window is to occupy the same location in the display area, the pixels of a higher priority window are displayed instead of the pixels of lower priority windows. Moreover, the priority ordering of the windows may be modified over time. Such a modification effects the resultant display by altering the appearance of which windows are in front of which other windows (i.e., by changing which portions of windows are visible and which portions are obscured). Typically, there is also a background "window," which occupies the entire display area and is permanently assigned the lowest display priority.

One approach to the display of overlapping windows employs a selection algorithm to determine which data to display at each location on the display screen in order to properly produce the desired image. Such an algorithm can be readily implemented in hardware, resulting in extremely efficient display systems. The display hardware may be provided with pointers to the individual window bitmaps, as well as information regarding the location and display priority of each window. The hardware then determines, for each location on the display screen, from which bitmap the pixel to be displayed should be retrieved, and which pixel data within that bitmap should be used.

The use of rectangular windows simplifies the handling of bitmapped data and the manipulation of the windows, resulting in efficient display systems. In particular, the position and size information for a rectangular window is commonly represented by only four numbers. These may be a horizontal location ("X") coordinate and a vertical location ("Y") coordinate to indicate the position of the window in the display area, and a width and height to indicate the size of the window. Equivalently, the four numbers used to identify the position and size information may be a horizontal start location ("Xstart"), a horizontal end location ("Xend"), a vertical start location ("Ystart"), and a vertical end location ("Yend"), thus defining the four corners of the window.

Window display systems typically display the data from individual window bitmaps by determining, for each pixel location in the display area, the window of highest priority which includes that pixel location. This determination is straightforward when the windows are rectangular. For example, when the four corners are used as described above to locate each window, that window includes a given X,Y pixel location if and only if X is not less than "Xstart" nor more than "Xend," and Y is not less than "Ystart" nor more than "Yend." Furthermore, once the appropriate choice of windows is made, retrieving the correct pixel data for the given pixel location in the display area is equally straightforward. Since the data is stored as a conventional rectangular array, a simple mathematical calculation is sufficient to locate the appropriate pixel data.

It would often be advantageous to include the ability to display an image contained in a rectangular window without displaying the surrounding portions of that window. In effect, these surrounding portions of a foreground window would be made "transparent," so that the images "behind" these portions of the foreground window become visible. From the viewer's perspective, such a capability would provide the functional equivalent of displaying "windows" of arbitrary shape. In multimedia applications, for example, it is desirable to construct video frames composed of a background scene plus a number of independently controllable objects. One such illustration would be a background consisting of an undersea scene, with many independently movable fish overlaid on that scene. If each fish were displayed as a complete rectangular window, the area of each of these windows which is outside the border of the image of the fish itself would inappropriately obscure part of the background (or a view of part of another fish) "behind" it. By displaying only the fish image, and not the surrounding portions of the window which contains it, a much more realistic scene would be displayed.

SUMMARY OF THE INVENTION

A technique is provided for the coding and display of a plurality of windows whereby a pixel in one window may have an independently specified display control parameter whose setting affects the appearance in the display of a pixel in another window. So, for example, the setting of the display control parameter for a first pixel in a first window may render a second pixel in a second window visible in place of the first pixel. In this manner, the first pixel is not displayed regardless of the display priority associated with its window.

In accordance with one illustrative embodiment of the present invention, each pixel within a window which is not to be displayed may be coded as "transparent." Then, upon display, those pixels which have been coded as transparent are recognized, and non-transparent pixels contained in lower priority windows are displayed instead of the transparent pixels contained in the higher priority windows. In this manner, specified portions of the window become transparent to the images "behind" them.

In accordance with another illustrative embodiment of the present invention, each pixel within a window may be assigned a display priority which differs from the display priority of other pixels in the window or the display priority of the window as a whole. Upon display, each pixel is then displayed (or not displayed) according to its own priority relative to that of other pixels in other windows at the same display location. Portions of a window may thus be made transparent by assigning the pixels contained in those portions a display priority lower than that of the non-transparent pixels in all other windows.

A pixel marked as transparent may have advantageously associated with it an integer indicating the number of successive pixels in the window which are also transparent. In this manner, the efficiency of a display system embodiment of the present invention may be increased by avoiding the need to check each of these successive pixels for transparency.

Images may be encoded for display by denoting pixels as transparent by assigning a preselected data value (or one of a plurality of preselected data values) to the pixel, which value is distinct from values otherwise used to indicate, e.g., the color and/or intensity for each displayed pixel. In this manner, it will not be necessary to associate data with each pixel in addition to the data field already reserved to store pixel color and/or intensity information, provided there exists at least one previously unassigned data value for that data field.

A display system embodiment may include one or more windows which contain full motion video images. Thus, e.g., overlapping television pictures of effectively arbitrary shape may advantageously be incorporated and overlapped with displays of other windows containing transparent portions.

In accordance with another illustrative embodiment of the present invention, the parameter associated with a first pixel in a first window may render a second pixel in a second window visible, but in such a manner that the appearance of the second pixel is effected by the first pixel. For example, the first pixel may be coded as "translucent," so that the resultant display (of the second pixel) appears on the display screen as a "combination" of the two pixels. In particular, although the second pixel will become (partially) visible, the first pixel will remain partially visible as well.

DETAILED DESCRIPTION

Figure 1:
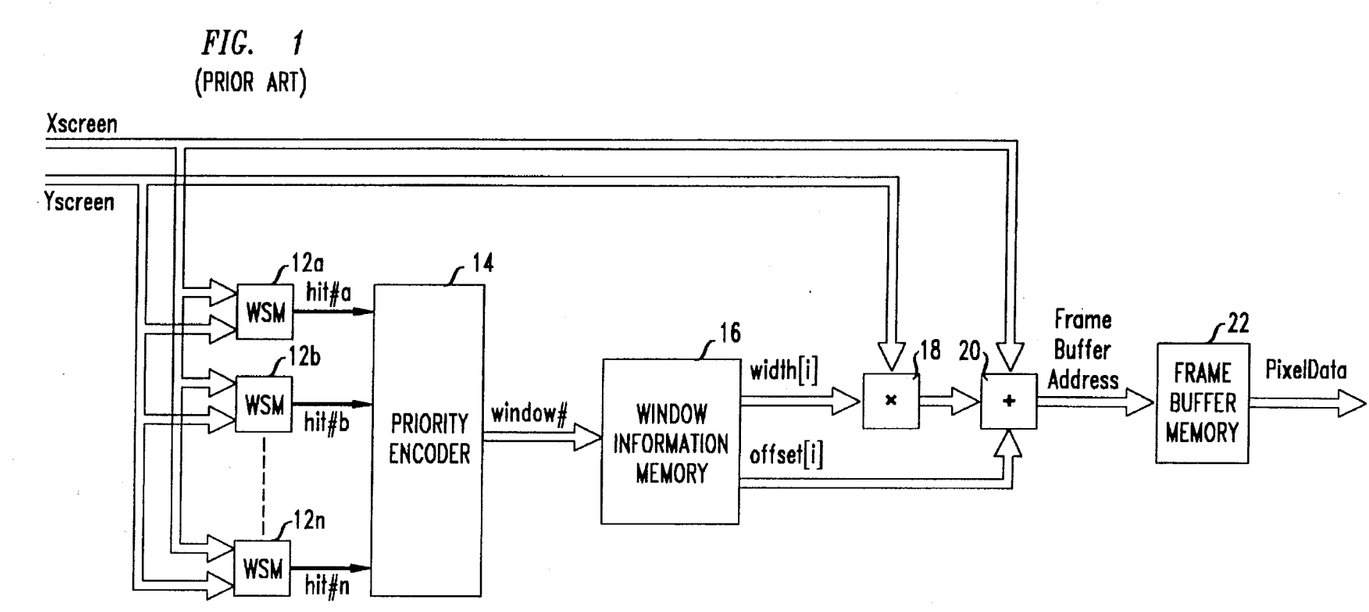
FIG. 1 shows a block diagram of a prior art display system for displaying overlapped windows.

FIG. 1 presents a block diagram of a prior art display system for the efficient display of overlapping windows. In particular, the illustrated system produces as output the pixel data for display at a given display location on a display screen. Note that the display screen itself may not be local. That is, the display data resulting from the system illustrated in FIG. 1 may be sent through a communications channel to a remote location at which the display screen is located. Moreover, this data may be sent in a compressed format for efficiency.

Input signals Xscreen and Yscreen are provided to the system. These signals represent the horizontal and vertical coordinates, respectively, of the screen location to be displayed. Output signal PixelData is produced as output by the system for display. The system comprises a plurality of Window State Machines 12a, 12b, ... 12n (hereafter "12"), Priority Encoder 14, Window Information Memory 16, Multiplier 18, Adder 20 and Frame Buffer Memory 22.

Window State Machines 12 are responsive to input signals Xscreen and Yscreen. Each produces a respective output signal hit#a, hit#b,... hit#n which is supplied to Priority Encoder 14. Each Window State Machine 12 also receives information representing the size and display location for a particular one of the windows to be displayed. Specifically, each Window State Machine 12 asserts its output signal if the current pixel display location (Xscreen, Yscreen) is within the boundaries of the window that has been assigned to it, as determined by the size and display location information provided. In this manner, the signals hit# a, hit#b, ... hit#n are indicative of the set of windows which are located so as to include the current pixel display location. Thus, a window in this set with the highest display priority is the one from which the pixel to be displayed at this location must be retrieved. Illustrative circuitry implementing the desired function for Window State Machines 12 is shown in detail in FIG. 2 and described below.

The windows to be displayed are assigned to Window State Machines 12 in order of decreasing display priority. In particular, the first Window State Machine 12a determines whether the window of highest display priority is "active," i.e., whether the current display location is within that window; the second Window State Machine 12b determines whether the window of second highest display priority is active; and so on. Since each window to be displayed (except the background "window") must be assigned to a unique Window State Machine, it should be appreciated that the number of Window State Machines 12 should be sufficient to provide for the maximum number of windows it is desired to display. Sixty four windows has been found to be sufficient for most applications, but the actual number can be greater or lower according to need.

Priority Encoder 14 is responsive to signals hit#a, hit#b, ... hit#n from Window State Machines 12 and produces an output signal window#. This output signal is supplied to Window Information Memory 16. In particular, output signal window# of Priority Encoder 14 specifies the number of the highest priority window which includes the current pixel display location (Xscreen, Yscreen) based on signals hit#a, hit#b,... hit#n. If none of the windows includes the current pixel display location, Priority Encoder 14 outputs n+1 for the value of window#, representing the background "window." Thus, the pixel to be displayed at the current location is determined by Priority Encoder 14 to be one contained in the window indicated by signal window#. Priority Encoder 14 may be implemented with conventional components familiar to those of ordinary skill in the art.

Window Information Memory 16 produces output signals width[i] and offset[i]. These output signals are supplied to Multiplier 18 and Adder 20, respectively. Multiplier 18 produces an output signal responsive to Window Information Memory 16 output width[i] and to system input signal Yscreen. This signal is supplied to Adder 20. The output signal of Multiplier 18 is the numerical product of the values of its two inputs. Adder 20, in turn, produces output signal FrameBufferAddress responsive to Window Information Memory 16 output offset[i], the output of Multiplier 18 and system input signal Xscreen. The output signal of Adder 20 is the numerical sum of the values of its three inputs.

For each window to be displayed, Window Information Memory 16 contains data representative of the location of the corresponding window bitmap (containing the pixel data of the window) in Frame Buffer Memory 22. Window Information Memory 16 also contains data representative of the size and display location of the window. In particular, Window Information Memory 16 stores two quantities for each window to be displayed. The first quantity stored is the width (horizontal size in pixels) of the window, and is supplied by Window Information Memory 16 as output signal width[i]. The second quantity stored is an "offset," supplied by Window Information Memory 16 as output signal offset[i]. Signal offset[i] has been pre-computed and stored in Window Information Memory 16 according to the following equation:

$$\text{offset}[i] = \text{WindowBaseAddr}[i] - \text{Xstart}[i] - (\text{Ystart}[i] * \text{width}[i]) \quad (1)$$

where WindowBaseAddr[i] is the starting location of the corresponding window bitmap in Frame Buffer Memory 22, Xstart and Ystart are the display location horizontal and vertical coordinates, respectively, of the upper left hand corner of the window and width[i] is the width of the window in pixels. In this manner the signal FrameBufferAddress, as computed by Multiplier 18 and Adder 20, will contain the location in Frame Buffer Memory 22 of the particular pixel within the window bitmap of the window selected by Priority Encoder 14 that is to be displayed at the current display screen location (Xscreen, Yscreen). This can be seen by the following analysis:

$$\begin{aligned}
\text{FrameBufferAddress} &= \text{Xscreen} + (\text{Yscreen} * \text{width}[i]) + \text{offset}[i] \\
&= \text{WindowBaseAddr}[i] + (\text{Xscreen} - \text{Xstart}[i]) + (\text{Yscreen} - \text{Ystart}[i]) * \text{width}[i]
\end{aligned} \quad (2)$$

Thus, given a bitmap stored in the conventional manner as an array ordered in a left to right sequence within a top to bottom sequence, FrameBufferAddress will point to the relative location (Xscreen-Xstart), (Yscreen-Ystart) within the bitmap of the window selected for display. This location will contain the pixel data to be displayed at the current location, Xscreen, Yscreen.

Window Information Memory 16 may be implemented with a conventional RAM (Random Access Memory) or other similar storage device familiar to those of ordinary skill in the art. Multiplier 18 and Adder 20 may also be implemented by conventional components (i.e., multipliers and adders, respectively).

Frame Buffer Memory 22 is responsive to output signal FrameBufferAddress of Multiplier 20 and produces system output signal PixelData, which provides the pixel data to be displayed on the display device at the current display location (Xscreen, Yscreen). The window bitmaps for each of the windows to be displayed are individually stored in Frame Buffer Memory 22, and data representative of the location and dimensions of each bitmap within the memory is stored in Window Information Memory 16 as described above. Frame Buffer Memory 22 may also be implemented by a conventional RAM or other similar storage device familiar to those of ordinary skill in the art.

It should be appreciated that there are alternative approaches to the technique described herein by which the signal FrameBufferAddress may be derived. For example, it is possible to avoid the process of multiplication and addition by a technique wherein a counter is added to each Window State Machine 12. In particular, at the start of each frame (each scan of the display device, beginning with Xscreen, Yscreen= 0, 0), the counter of each Window State Machine is loaded with the Window Base Address of its corresponding window (i.e., the starting location in Frame Buffer Memory 22 of the bitmap for that window). This can be achieved by the incorporation of an additional register, which stores the Window Base Address, into each Window State Machine 12. For each screen location at which the output signal hit#a, hit#b, . . . hit#n of a Window State Machine is asserted, the corresponding counter is incremented. Thus, the address contained in the counter will point to the next pixel in that window's bitmap in Frame Buffer Memory 22.

In this manner, the counter of the Window State Machine 12 which corresponds to the window selected by Priority Encoder 14 will contain the address in Frame Buffer Memory 22 of the pixel to be displayed. The address contained in the aforesaid counter may be readily selected by a selector device controlled by the signal window#, and then may be output as the signal FrameBufferAddress. Although this technique is likely to be more efficient with respect to execution speed, it requires a multiplicity of extra devices (an additional counter and register for each Window State Machine). The technique illustrated in FIG. 1 requires only a single multiplier to perform the equivalent function. Thus, the choice of which approach is to be preferred depends on the circumstances.

Figure 2:
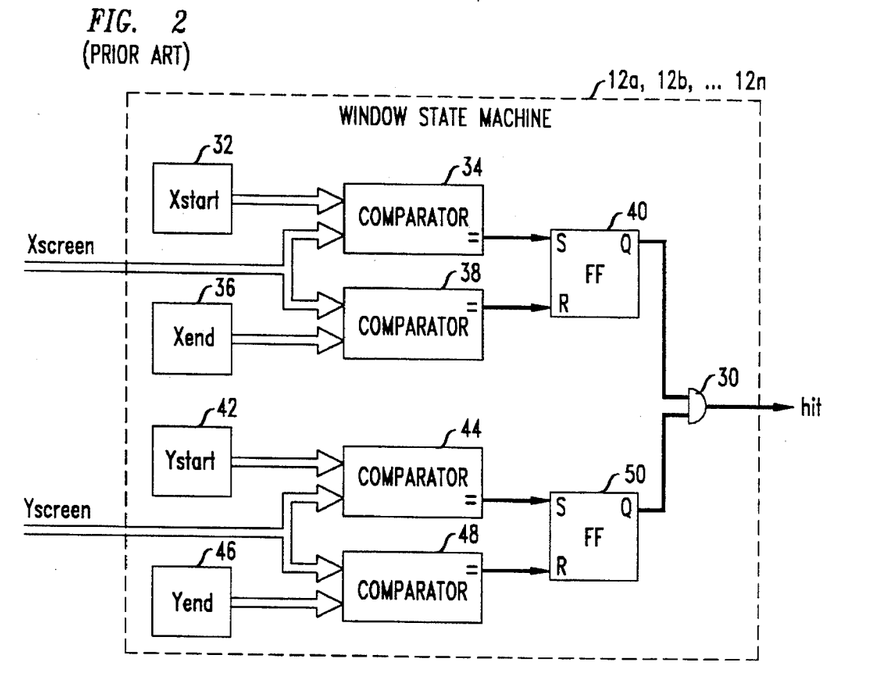
FIG. 2 shows the detailed structure of a window state machine included in the system of FIG. 1.

FIG. 2 shows the detailed circuit structure of each Window Sate Machine 12 of FIG. 1. The circuit operates by comparing the current display location (circuit inputs Xscreen, Yscreen) with the corner locations of its assigned window to determine whether the current location is within the boundaries of the window. It comprises Registers 32, 36, 42 and 46, Comparators 34, 38, 44 and 48, Flip-flops 40 and 50, and And-gate 30. Registers 32, 36, 42 and 46 are loaded with the horizontal start location (Xstart), the horizontal end location (Xend), the vertical start location (Ystart), and the vertical end location (Yend) of the assigned window, respectively.

In operation, when the value of Xscreen reaches Xstart, Comparator 34 sets Flip-flop 40, and when the value of Xscreen reaches Xend, Comparator 38 resets Flip-flop 40. In this manner, Flip-flop 40 is set only during the period when Xscreen is between Xstart and Xend. Similarly, when the value of Yscreen reaches Ystart, Comparator 44 sets Flip-flop 50, and when the value of Yscreen reaches Yend, Comparator 48 resets Flip-flop 50. In this manner, Flip-flop 50 is set only during the period when Yscreen is between Ystart and Yend. Therefore, both Flip-flops 40 and 50 are simultaneously set only when Xscreen is between Xstart and Xend and when Yscreen is between Ystart and Yend. Thus, And-gate 30 asserts the circuit output signal hit only when Xscreen, Yscreen is within the boundaries of the assigned window.

Figure 3:
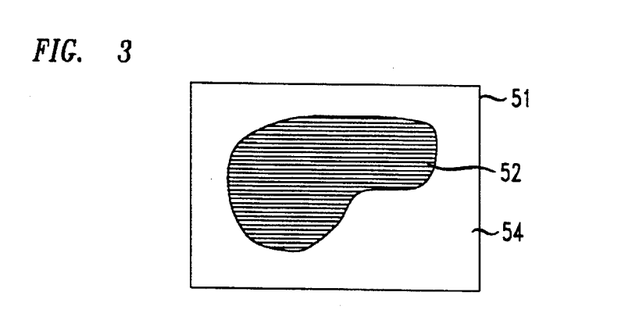
FIGS. 3 and 4 show windows comprising images which have been coded for transparency according to an embodiment of the present invention.
Figure 4:
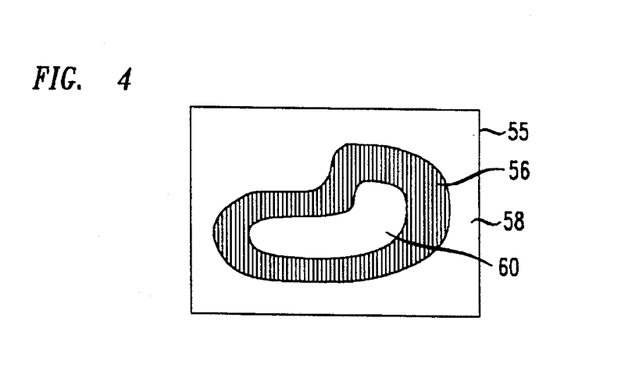

FIGS. 3 and 4 show windows which have been coded for display according to an embodiment of the present invention. In FIG. 3, the image of object 52 is contained in window 51. Area 54 is that part of the area of window 51 that does not constitute part of the image of object 52. In accordance with the objectives of an embodiment of the present invention, it is desired that object 52 be coded for display so that when overlaid on images contained in one or more other windows, object 52 is displayed without the contents of area 54 being displayed as well. In accordance with one illustrative embodiment of the present invention, this may be achieved by coding the pixels in area 54 as "transparent." In this manner, these pixels will not be displayed by the system. The images contained in other windows "behind" area 54 of window 51 will be displayed instead.

In accordance with another illustrative embodiment of the present invention, these selected pixels may be assigned a display priority which differs from the display priority of the unselected (i.e., non-transparent) pixels in the window. Moreover, this different display priority may be lower than the display priority of all non-transparent pixels in all windows. In such a manner, the visibility of those areas of other windows which appear "behind" area 54 (which would otherwise not be displayed) will advantageously not be obscured from view when window 51 is displayed.

In FIG. 4, the image of object 56 is contained in window 55. In this case, however, both area 58 outside of object 56 and area 60 inside of object 56 are not part of the image of the object, and it is therefore desired to code both of these areas as transparent.

Figure 5:
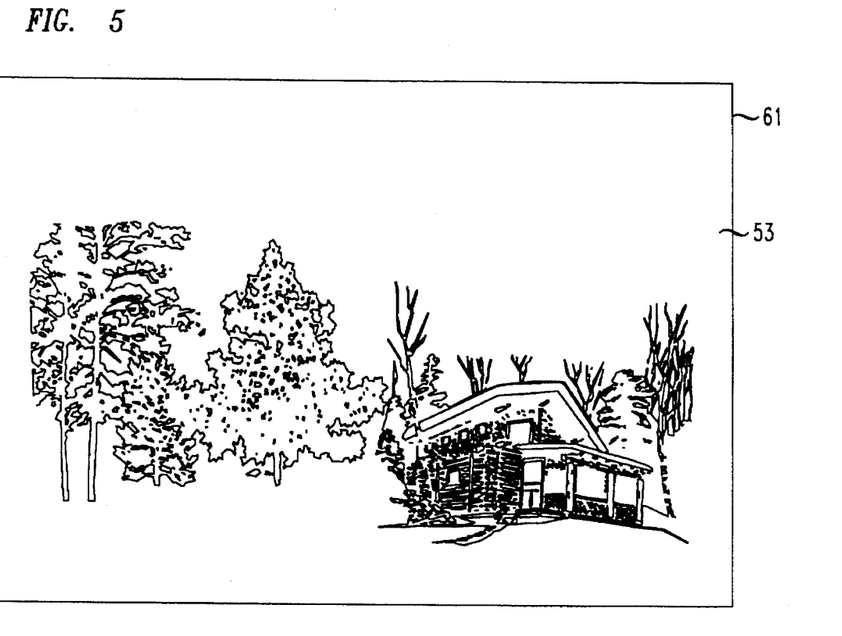
FIG. 5 shows a background scene over which the windows of FIGS. 3 and 4 are to be overlaid.
Figure 6:
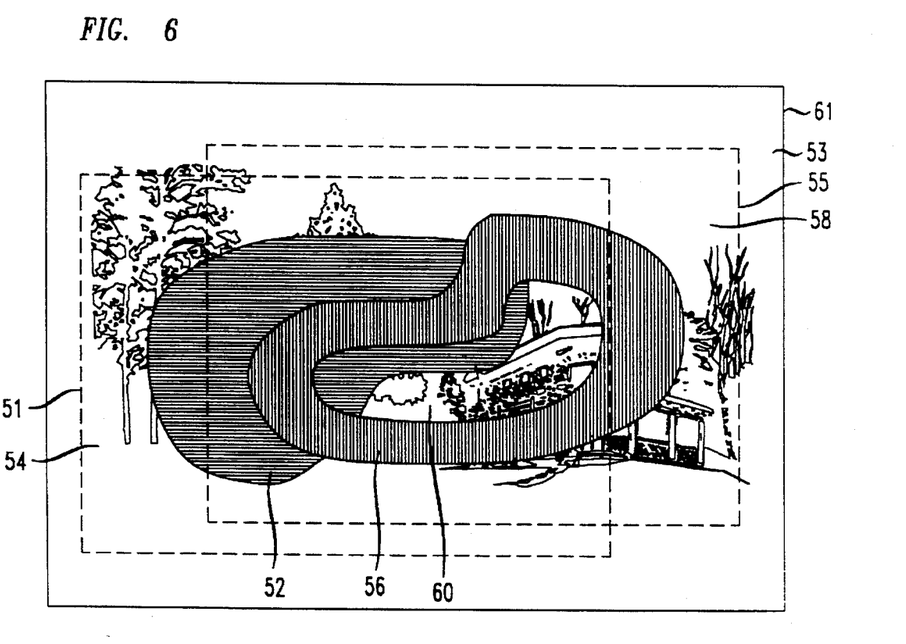
FIG. 6 shows a resulting display of the background scene of FIG. 5 overlaid with the partially transparent windows of FIGS. 3 and 4 according to an embodiment of the present invention.

FIG. 5 shows window 61 containing background scene 53. In accordance with an embodiment of the present invention, it is desired to display the image of object 52 in front of background scene 53, with the image of object 56 in front of the image of object 52, in turn. By coding areas 54, 58 and 60 as transparent in accordance with one embodiment of the present invention, the resulting display of FIG. 6 is achieved. In this display, object 56 is the foreground image, the image of object 52 is in the middle ground, and scene 53 is in the background. Moreover, area 54 has become (i.e. been coded as) transparent so as not to obscure the visibility of that part of scene 53 outside of the boundaries of object 52. Also, areas 58 and 60 have become transparent so as not to obscure the visibility of either that part of object 52 outside of the boundaries of object 56, or that part of scene 53 outside of the boundaries of object 56.

Figure 7:
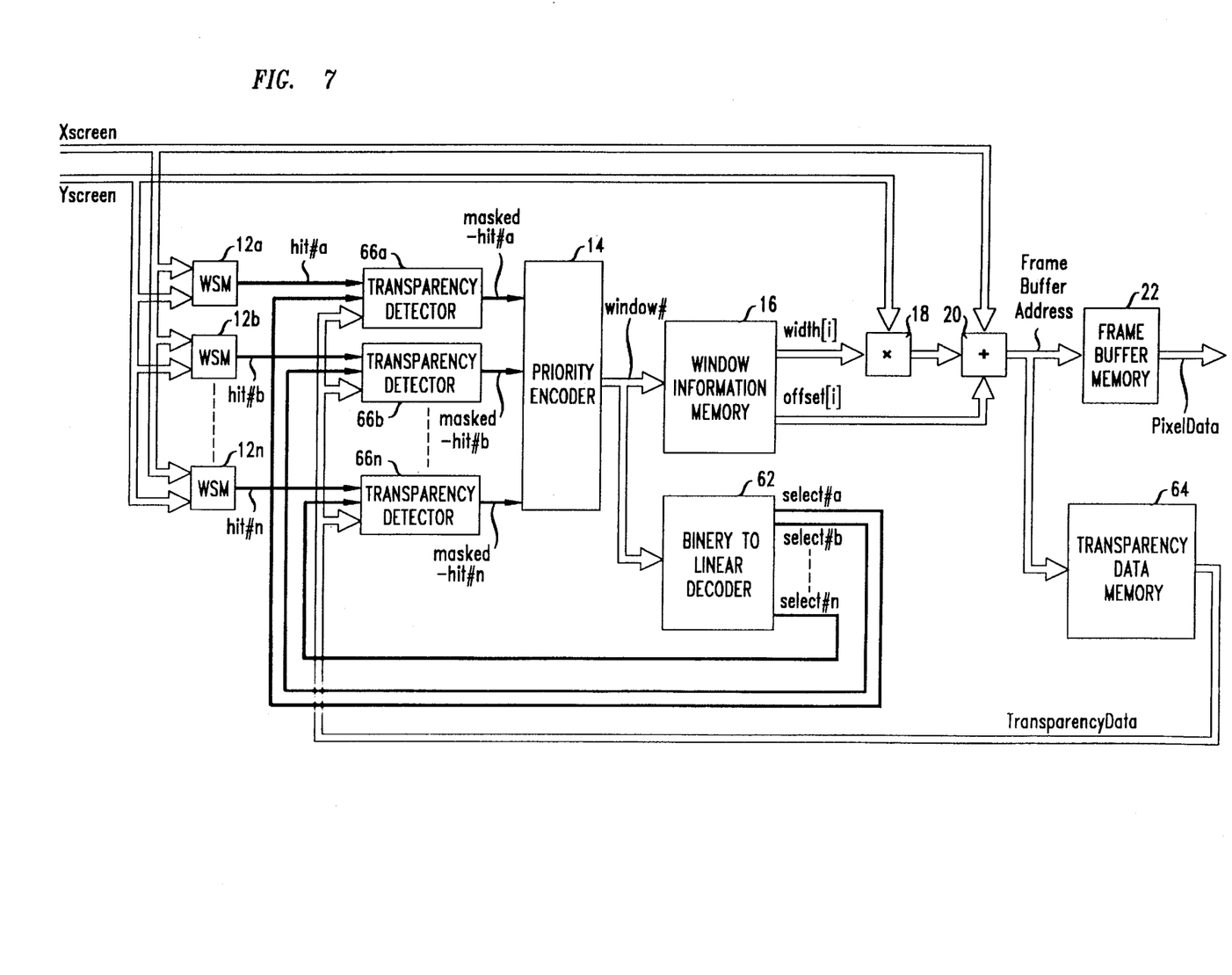
FIG. 7 shows a block diagram of the system of FIG. 1 modified to provide for transparency in accordance with an embodiment of the present invention.

FIG. 7 shows a block diagram of the system of FIG. 1 modified to provide for transparency in accordance with one embodiment of the present invention. The modified system recognizes pixels within a window being displayed which have been coded as transparent as, for example, in the illustrations of FIGS. 3 and 4. The system accordingly displays pixels contained in overlapped windows of lower priority instead. The illustrated system produces as output the pixel data for display at a given display location on a display screen, as does the prior art system of FIG. 1. Specifically, input signals Xscreen and Xscreen are provided to the system, representing the horizontal and vertical coordinates of the screen location to be displayed, and output signal PixelData is produced for display. In addition to a plurality of Window State Machines 12, Priority Encoder 14, Window Information Memory 16, Multiplier 18, Adder 20 and Frame Buffer Memory 22, as contained in the system of FIG. 1, the modified system of FIG. 7 also comprises Binary-to-linear Decoder 62, Transparency Data Memory 64, and Transparency Detectors 66a, 66b, . . . 66n (hereafter 66).

In the system of FIG. 7, the output signals hit#a, hit#b, . . . hit#n of Window State Machines 12 are supplied to Transparency Detectors 66 rather than directly to Priority Encoder 14. These intervening circuits determine whether the pixel initially selected for display has been coded as transparent. If it has been so coded, the "hit" signal hit#a, hit#b, . . . hit#n for the selected window is masked (i.e. disabled), thereby forcing Priority Encoder 14 to select an alternate window.

In particular, Priority Encoder 14 will select the window of next highest display priority to the window whose hit signal has just been masked for which the current pixel display location (Xscreen, Yscreen) is also included in the boundaries thereof. Then, of course, the circuitry subsequent to Priority Encoder 14 will advantageously retrieve the appropriate pixel data from that subsequently chosen window. This pixel data represents part of an image in a lower priority window which has been revealed by the transparency in the higher priority window at this location.

Moreover, if the re-selected pixel is then determined to be transparent by another one of Transparency Detectors 66, the process will iterate. This iteration will continue until either a non-transparent pixel is found for display at the current location or until the background "window" (window#= n+1) is selected by Priority Encoder 14. (Recall that the background window occupies the entire display screen and contains no transparent pixels.) When either of these terminal conditions is reached the current value of PixelData may be declared valid and displayed at the current screen location (Xscreen, Yscreen), and the screen location may then be advanced. In this manner, the pixel displayed at each screen location will be the non-transparent pixel of highest priority (i.e., in the window of highest priority) whose window is positioned such that the pixel is located at the current screen location.

Specifically, Transparency Detectors 66 are responsive to output 20 signals hit#a, hit#b, . . . hit#n of Window State Machines 12a, 12b, . . . 12n, respectively, output signals select#a, select#b, . . . select#c of Binary-to-linear Decoder 62, respectively, and output signal TransparencyData of Transparency Data Memory 64. Illustrative circuitry which implements one embodiment of the above described function of Transparency Detectors 66 is shown in detail in FIG. 8 and described below.

Binary-to-linear Decoder 62 is responsive to output signal window# of Priority Encoder 14 and produces output signals select#a, select#b, . . . and select#c. The decoder asserts the one output signal select#a/select#b/ . . . /select#n which corresponds to the number specified by input signal window#. This enables the corresponding Transparency Detector 66 to check for transparency of the given pixel in the selected window. Binary-to-linear Decoder 62 may be implemented by a conventional decoder or similar components familiar to those of ordinary skill in the art.

Transparency Data Memory 64 is responsive to output signal FrameBufferAddress of Multiplier 20 and produces output signal TransparencyData, supplied to each Transparency Detector 66. In particular, this memory stores the transparency data (e.g., whether a pixel is transparent) for each pixel of each window. The data is advantageously organized in the memory in an identical format as are the window bitmaps, as arrays ordered in the conventional left to right order within a top to bottom sequence. Moreover, the transparency data for each window may be stored at the same memory location in Transparency Data Memory 64 as are the window bitmaps in Frame Buffer Memory 22. In this manner, both memory devices advantageously use the same input signal (FrameBufferAddress) as a look-up address, obviating any need for separate address calculations. Transparency Data Memory 64 may be implemented by a conventional RAM or other similar storage device familiar to those of ordinary skill in the art. Moreover, Transparency Data Memory 64 and Frame Buffer Memory 22 may be advantageously consolidated into a single memory device.

Figure 8:
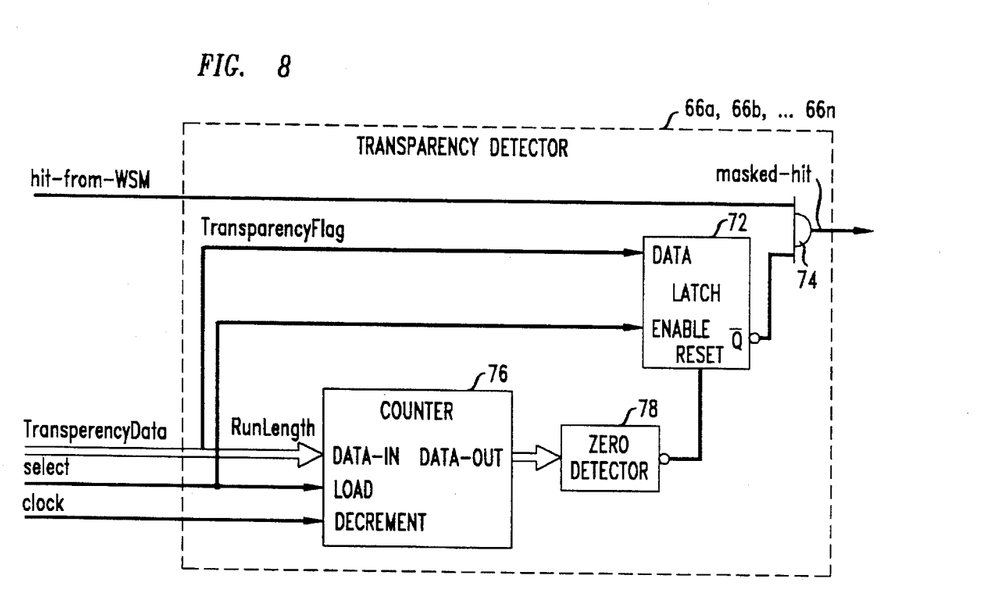
FIG. 8 shows the detailed structure of a transparency detector circuit included in the system of FIG. 7 in accordance with an embodiment of the present invention.

FIG. 8 shows the circuit structure of each Transparency Detector 66 according to one embodiment of the present invention. In this embodiment each pixel has an associated "flag" (a one bit data item), TransparencyFlag. This flag indicates whether the pixel has been coded as transparent. Moreover, each transparent pixel also has an associated integer, RunLength. This integer indicates the number of successive pixels in this window from the current pixel forward which are transparent. In this manner, a continuous sequence of transparent pixels may be advantageously processed with increased efficiency, since Transparency Detectors 66 often need not check each pixel for transparency. Rather, the Transparency Detectors will inhibit their output ('hit') signal for the entire length of the "run" of transparent pixels as specified by the value of signal RunLength. Note that continuous sequences of transparent pixels are, in fact, a very common occurrence, since, in general, entire areas of windows may be advantageously coded for transparency. Both of the aforementioned data items which may be associated with each pixel are stored in Transparency Data Memory 64.

Specifically the Transparency Detector circuit of FIG. 8 provides output signal masked-hit which is active when input signal hit-from-WSM is active unless it has been determined that the chosen pixel from the selected window was coded as transparent. Input signal hit-from-WSM is connected to the hit signal (hit#a/hit#b/ . . . /hit#n) from the Window State Machine which corresponds to the given Transparency Detector. That is, hit#a is connected to the hit-from-WSM input signal of Transparency Detector 66a, hit#b is connected to the hit-from-WSM input signal of Transparency Detector 66b, etc.

Input signal TransparencyData comprises two component data items, TransparencyFlag and RunLength. Since TransparencyFlag is a flag signal and thus requires only a single bit, it is advantageous to provide both signals in a single data field (for example, a single byte). This data field may provide one bit (for example, the high order bit) for the flag data while the remainder of the field contains the data RunLength. If the number of successive transparent pixels exceeds the representative capacity of the signal RunLength, the transparency data can be coded as a plurality of successive runs of shorter lengths.

In addition, the Transparency Detector circuit of FIG. 8 is provided with input signal clock and input signal select. Input signal clock is connected to the primary clock signal of the system which causes the values of the current screen display location (Xscreen, Yscreen) to be advanced to the next location. This input clock signal is used by the Transparency Detector circuit to determine when a continuous run of successive transparent pixels, as indicated by input signal RunLength, has been exhausted. Input signal select is connected to the corresponding select signal ( select#a/select#b/ . . . /select#n) from Binary-to-linear Decoder 62. That is, select#a is connected to the select input signal of Transparency Detector 66a, select#b is connected to the select input signal of Transparency Detector 66b, etc. This input signal is used to sample the flag TransparencyFlag and also to store the count RunLength so that it may be decremented with each clock of input signal clock to determine when a continuous run of successive transparent pixels has been exhausted.

Specifically, the Transparency Detector circuit of FIG. 8 comprises Latch 72, And-gate 74, Counter 76 and Zero Detector 78. The data input and the load (latch enable)input of Latch 72 are supplied by input signals TransparencyFlag and select, respectively. Thus, whenever the window corresponding to a given Transparency Detector is selected (by Priority Encoder 14), Latch 72 will be loaded with a flag which indicates whether the pixel of that window which is to be displayed at the current location has been coded as transparent. If it has been so coded, the (inverted) output of Latch 72, which is provided to And-gate 74, will inhibit the active hit-from-WSM input signal from being passed through to output signal masked-hit. That is, masked-hit will be made inactive whenever a pixel coded as transparent has been initially chosen for display. Latch 72 and And-gate 74 may be implemented with conventional components.

Counter 76 and Zero Detector 78 provide the means for keeping the output signal masked-hit disabled throughout a continuous run of successive transparent pixels, as specified by input signal RunLength. In particular, the parallel data inputs of Counter 76 are supplied by input signal RunLength, the load input is supplied by input signal select, and the decrement input is supplied by input signal clock. Thus, whenever the window corresponding to a given Transparency Detector is selected (by Priority Encoder 14), Counter 76 will be loaded with a count of successive transparent pixels, if such a count has been provided on input signal RunLength.

The count maintained in Counter 76 will be decremented each time input signal clock is activated, that is, each time the current screen display location (Xscreen, Yscreen) is advanced. Thus, when Counter 76 has been decremented to zero, the run length of successive transparent pixels specified has been exhausted. Zero Detector 78, which receives the parallel data outputs of Counter 76, will at that time activate its output signal. This output signal is provided to the reset input of Latch 72, thereby resetting the latch. Until the count reaches zero, Latch 72 will remain in the state to which it was set by the first transparent pixel encountered in the run of successive transparent pixels. Thus, the output signal masked-hit will remain disabled by And-gate 74.

Note that both the transparency flag and the run length data are advantageously set for all transparent pixels in a run of successive transparent pixels, as if each pixel were the first transparent pixel in the run. This results from the fact that a previously obscured window (i.e., one of less than highest priority) may become visible at a point in the higher priority window where there is a transparent pixel within a run of transparent pixels, as the current screen display location, Xscreen, is advanced. In this case, the newly visible window's Transparency Detector may not have been loaded with the data representing the run of transparent pixels.

If the pixel to be displayed is not transparent, Counter 76 and Zero Detector 78 will not have a meaningful effect on the operation of circuit since Latch 72 will already be in a reset state. Therefore any data loaded into Counter 76 for such pixels will be irrelevant.

Counter 76 may be implemented with conventional components familiar to one of ordinary skill in the art. For example, if input signal RunLength is comprised of 7 bits (one bit less than a byte), a 7-bit parallel load, parallel output up/down counter may be used. Zero Detector 78 may also be implemented with conventional components, such as a multiple input Nand-gate having one input for each parallel data output of Counter 76.

Note that pixels that are not coded as transparent do not make use of the RunLength field of data as stored in Transparency Data Memory 64. Moreover, pixels that are coded as transparent do not make use of their corresponding pixel data as stored in Frame Buffer Memory 22. Thus, in another illustrative embodiment of the present invention, the two memories may be advantageously combined. For example, Frame Buffer Memory 22 may be used to store both the transparency flag and a data field which stores either pixel data for non-transparent pixels or a run-length for transparent pixels.

Figure 9:
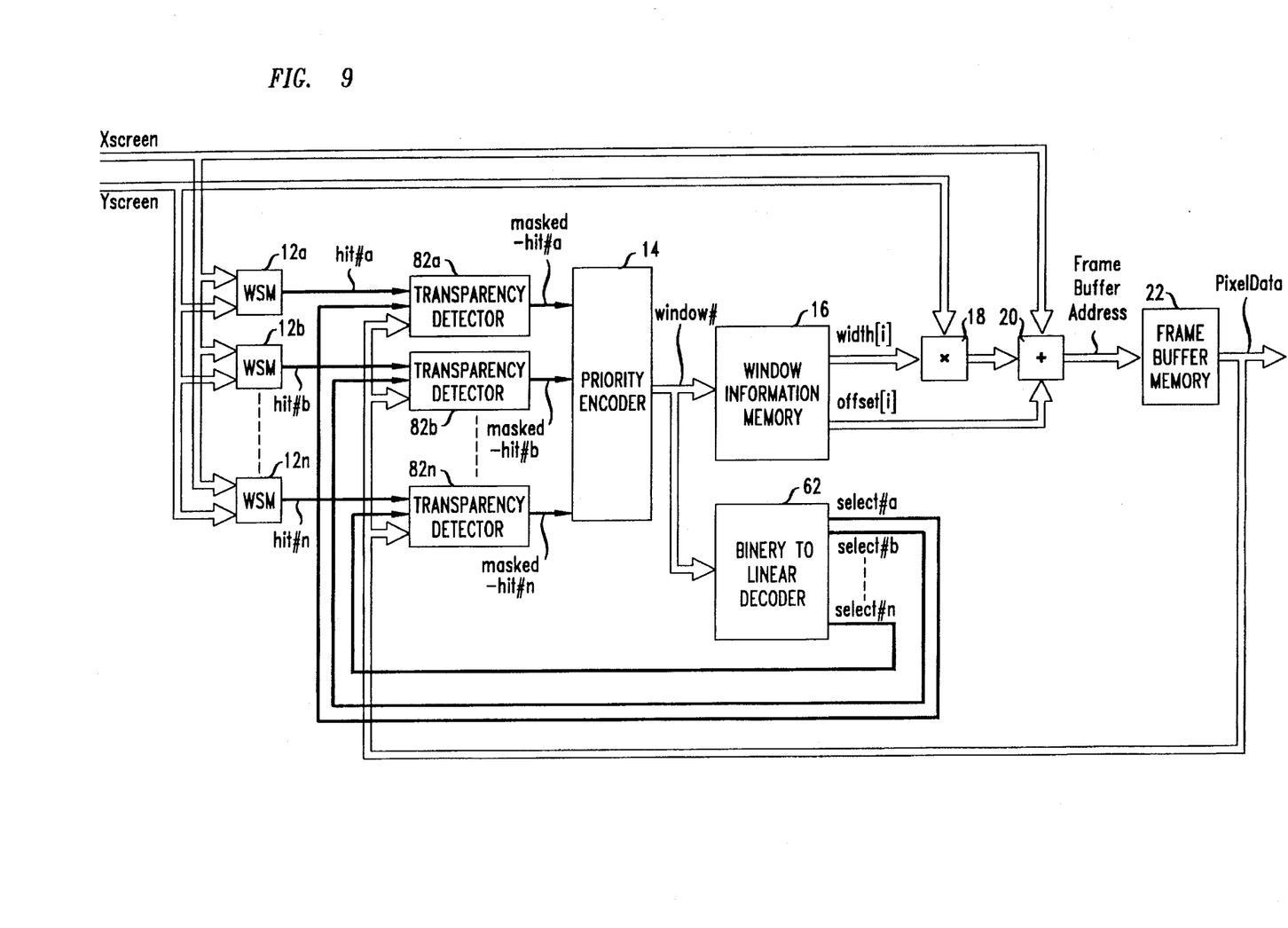
FIG. 9 shows a block diagram of the system of FIG. 1 modified to provide for transparency in accordance with a second embodiment of the present invention.

FIG. 9 shows a block diagram of the system of FIG. 1 modified to provide for transparency in accordance with another embodiment of the present invention. In this system, pixels are coded as transparent by assigning an otherwise unassigned data value for the pixel data as stored in Frame Buffer Memory 22. It is most common that the pixel data consists of an encoded representation of color and/or intensity information which is provided to the display system for display on the display screen. In some cases, there may be possible encodings of the pixel data which have not been assigned to any of the color and/or intensity indications which need to be represented. For example, if 8 bits are provided to represent the intensity level of a pixel in a black and white display system, but less than 64 possible intensity levels are distinguished by the system, one or more of the remaining encodings of the 8 bits may be used to indicate that the pixel has been coded as transparent.

The illustrated system produces as output the pixel data for display at a given display location on a display screen, as does the prior art system of FIG. 1 and the embodiment of the present invention illustrated in FIG. 7. Input signals Xscreen and Yscreen are provided to the system, representing the horizontal and vertical coordinates, respectively, of the screen location to be displayed, and output signal PixelData is produced for display. In addition to a plurality of Window State Machines 12, Priority Encoder 14, Window Information Memory 16, Multiplier 18, Adder 20 and Frame Buffer Memory 22, as contained in the system of FIG. 1, the modified system of FIG. 9 also comprises Binary-to-linear Decoder 62 and Transparency Detectors 82a, 82b, . . . 82n (hereafter 82).

Figure 10:
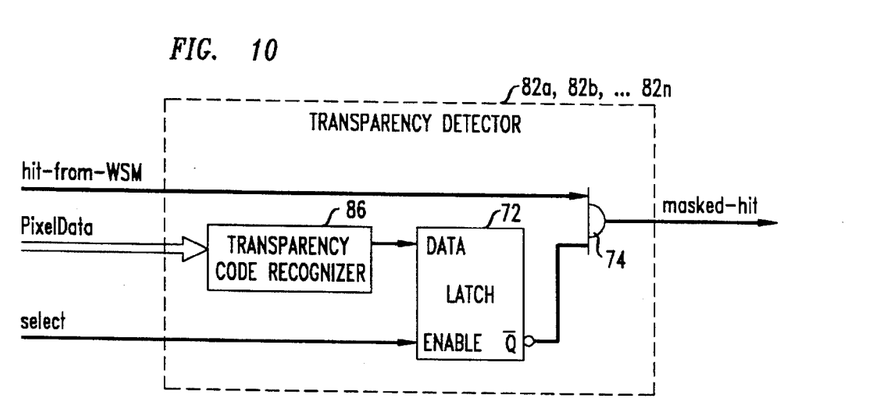
FIG. 10 shows the detailed structure of a transparency detector circuit included in the system of FIG. 9 in accordance with the second embodiment of the present invention.

Note that unlike the system of FIG. 7, there is no need for Transparency Data Memory 64 since the transparency information is contained directly in the pixel data. Therefore, Transparency Detectors 82 are responsive to output signals hit#a, hit#b, . . . hit#n of Window State Machines 12a, 12b, . . . 12n, respectively, output signals select#a, select#b, . . . select#c of Binary-to-linear Decoder 62, respectively, and (unlike Transparency Detectors 66 of FIG. 7) output signal PixelData of Frame Buffer Memory 22. Like their counterparts in the system of FIG. 7, Transparency Detectors 82 determine whether the pixel initially selected for display has been coded as transparent. If it has been so coded, the "hit" signal hit#a/hit#b/. . . . /hit#n for the selected window is masked (i.e. disabled), thereby forcing Priority Encoder 14 to select an alternate window FIG. 10 shows illustrative circuitry which implements the structure of one embodiment of the above described function of Transparency Detectors 82. Like the circuit of FIG. 8, the Transparency Detector of FIG. 10 provides output signal masked-hit which is active when input signal hit-from-WSM is active unless it has been determined that the chosen pixel from the selected window has been coded as transparent. Input signal hit-from-WSM is again connected to the hit signal (hit#a/hit#b/ . . . /hit#n) generated by the Window State Machine which corresponds to the given Transparency Detector. That is, hit#a is connected to the hit-from-WSM signal of Transparency Detector 82a, hit#b is connected to the hit-from-WSM signal of Transparency Detector 82b, etc.

Input signal select is connected to the corresponding select signal (select#a/select#b/ . . . /select#n) from Binary-to-linear Decoder 62. That is, select#a is connected to the select signal of Transparency Detector 66a, select#b is connected to the select signal of Transparency Detector 66b, etc. Like the circuit of FIG. 8, this input signal is used to sample the flag which indicates whether the current pixel has been coded as transparent. Unlike the circuit of FIG. 8, however, in this embodiment the flag is to be generated from the encoded value of input signal PixelData, rather than being directly provided. Thus, the Transparency Detector of FIG. 10 comprises Transparency Code Recognizer 86, as well as Latch 72 and And-gate 74.

The input of Transparency Code Recognizer 86 is supplied by input signal PixelData, and its output is supplied to the data input of Latch 72. The load (latch enable) input of Latch 72 is supplied by input signal select. Specifically, Transparency Code Recognizer 86 produces an active output signal if and only if the value of PixelData is that value (or one of those values) which has been assigned to encode pixels as transparent. Thus, whenever the window corresponding to a given Transparency Detector is selected (by Priority Encoder 14), Latch 72 will be loaded with a flag which indicates whether the pixel of that window which is to be displayed at the current location has been coded as transparent. If it has been so coded, the (inverted) output of Latch 72, which is provided to And-gate 74, will inhibit the active hit-from-WSM input signal from being passed through to output signal masked-bit. That is, just as in the system of FIGS. 7 and 8, masked-hit will be made inactive whenever a pixel coded as transparent has been initially chosen for display. Transparency Code Recognizer 86 may be implemented with conventional components, such as gates or digital comparators, familiar to those of ordinary skill in the art.

Figure 11:
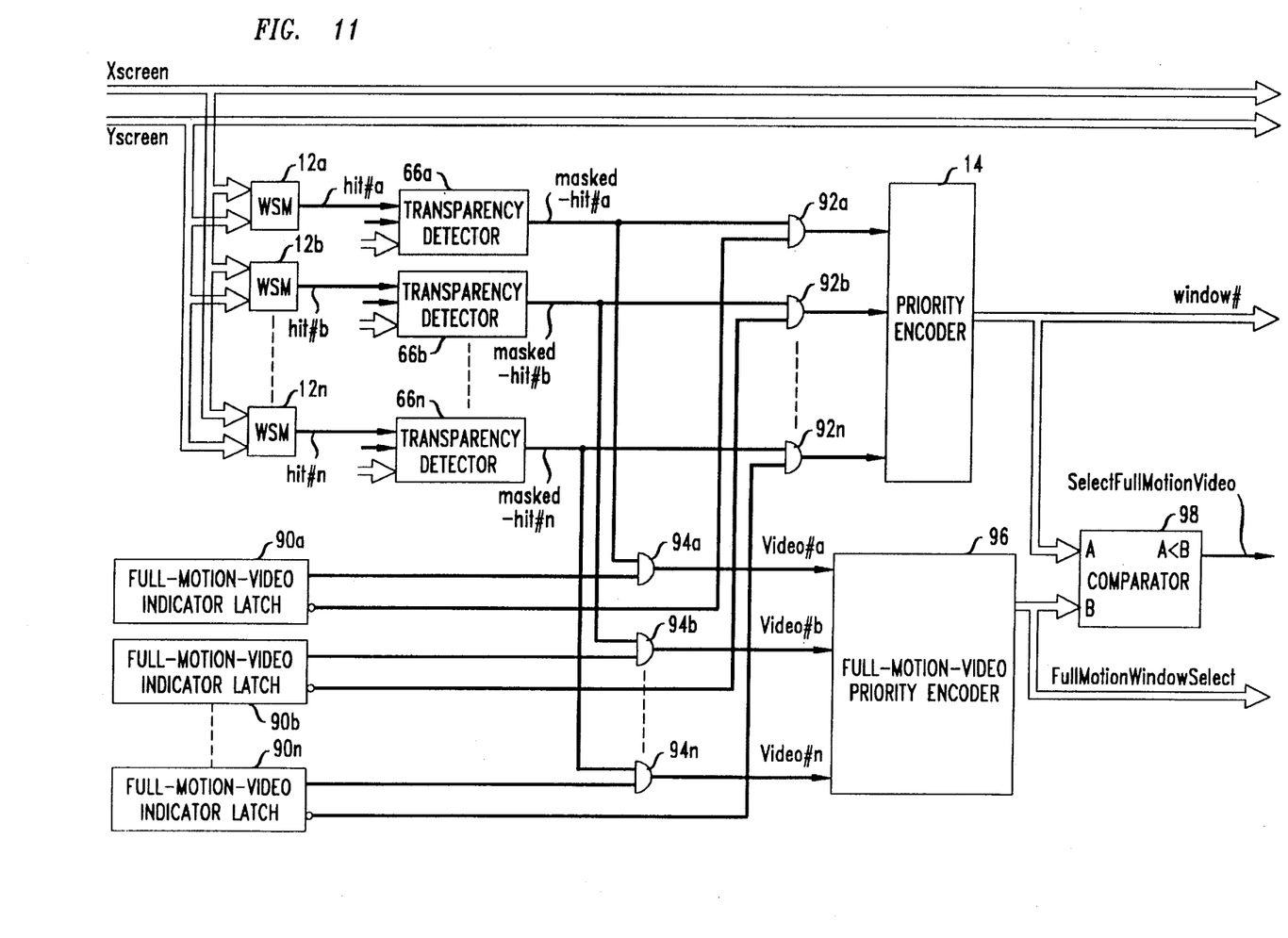
FIG. 11 shows a portion of the block diagram of FIG. 7 modified to incorporate full motion video windows in accordance with a third embodiment of the present invention.

FIG. 11 shows a portion of a block diagram of the system of FIG. 7 modified to include circuitry to advantageously incorporate full motion video windows. Although the pixel data stored in and retrieved from Frame Buffer Memory 22 of the systems of FIG. 7 or FIG. 9 may be used to represent an image generated in any manner, alternative methods for the retrieval of pixel data which represent full motion video (i.e., television) images may be provided.

In particular, television images are updated frequently (commonly at a rate of 30 frames per second), and therefore the pixel data may change rapidly. For example, this data is likely to be generated "on-the-fly" from a television signal, in such a manner that it is not convenient or economical to store the pixel data in a memory prior to its display. Alternatively, the data may be provided or stored in a compressed or other non-bitmapped format, making it inefficient to require the generation of a bitmap for storage in Frame Buffer Memory 22. Thus, the system of FIG. 11 illustrates one embodiment of a display system in which windows comprising full motion video images may be displayed concurrently with other overlapping windows which may include transparent pixels.

The system of FIG. 11 assumes that the pixel data for full motion video windows are supplied to the display system by means separate from Frame Buffer Memory 22. For example, this data may come from an external hardware "chip" based on a MPEG (Motion Pictures Executive Group) standard television format. The system, therefore, must be able to retrieve the pixel data from alternate sources (i.e., either Frame Buffer Memory 22 or from an "MPEG chip"), depending on whether the window being displayed is a full motion video window. To accomplish this, the system of FIG. 11 comprises Full-motion-video Indicator Latches 90a, 90b, . . . 90n (hereafter 90), And-gates 92a, 92b, . . . 92n (hereafter 92), And-gates 94a, 94b, . . . 94n (hereafter 94), Full-motion-video Priority Encoder 96, and Comparator 98, in addition to a plurality of Window State Machines 12, Priority Encoder 14, Window Information Memory 16, Multiplier 18, Adder 20, Frame Buffer Memory 22, Binary-to-linear Decoder 62, Transparency Data Memory 64, and Transparency Detectors 66, as contained in the system of FIG. 7.

In the system of FIG. 11, Full-motion-video Indicator Latches 90 each store a flag indicating whether the corresponding window is a full motion video window. The output signals of Transparency Detectors 66, are supplied to And-gates 92, respectively, rather than directly to Priority Encoder 14 as in the system of FIG. 7. The inverted output signals of Full-motion-video Indicator Latches 90 are also supplied to And-gates 92. These intervening gates thereby serve to inhibit the "hit" signal for full motion video windows, ensuring that Priority Encoder 14 will select only non-television windows. In particular, the non-television window of highest priority will be selected by Priority Encoder 14, the appropriate pixel data and transparency data for that window will be retrieved, and Transparency Detectors 66 will iteratively inhibit the selection of windows whose chosen pixel has been coded as transparent, as in the operation of the system of FIG. 7.

In this embodiment, however, the additional circuitry of FIG. 11 will simultaneously determine the full motion video window of highest priority at the current display location (if any), excluding those for which the chosen pixel has been coded as transparent. In other words, just as Priority Encoder 14 selects the highest priority non-television window whose chosen pixel is nontransparent, Full-motion-video Priority Encoder 96 selects the highest priority television window whose chosen pixel is non-transparent. In addition, the system of FIG. 11 will compare the priorities of the highest priority television window and the highest priority non-television window, to determine which of the two should be displayed. Specifically, it must be determined whether the pixel data should be retrieved from Frame Buffer Memory 22 or from, for example, an MPEG chip.

The output signals of Full-motion-video Indicator Latches 90 are supplied to And-gates 94, respectively, as are the "masked hit" signals masked-hit#a, masked-hit#b, . . . masked-hit#n. The output signals of And-gates 94, namely Video#a, Video#b, . . . Video#n, are in turn supplied to the inputs of Full-motion-video Priority Encoder 96, in priority order (i.e., in the same order as the corresponding window circuits supply Priority Encoder 14). Finally, Comparator 98 is supplied by the output signals of Full-motion-video Priority Encoder 96 and Priority Encoder 14. Comparator 98 asserts its output signal SelectFullMotionVideo if and only if the priority of the selected full motion video window (as specified by the output of Full-motion-video Priority Encoder 96) is greater than the priority of the selected non-television window (as specified by the output of Priority Encoder 14). Therefore, signal SelectFullMotionVideo indicates whether the pixel data for the current display location is to be retrieved from the external hardware providing the television data or from Frame Buffer Memory 22, which contains the bitmaps for the non-television windows. If the pixel data is to be retrieved from the external hardware, the output signal of Full-motion-video Priority Encoder 96, FullMotionWindowSelect, may be used to determine which full motion video window is selected for display. Note that the (unmasked) "hit" signals hit# a, hit#b,... hit#n corresponding to full motion video windows may be used to advance (clock) the pixel data for each externally supplied television image, since the assertion of each of these signals indicates that the current display location lies within the corresponding full motion video window.

The system of FIG. 9 may be modified in an analogous manner to incorporate full motion video windows. In other words, the circuitry of FIG. 11 which has been added to the system of FIG. 7 may be added in an identical fashion to the system of FIG. 9. Whether the transparency information is obtained based on the contents of Transparency Data Memory 64 as in FIG. 7, the value of PixelData retrieved from Frame Buffer Memory 22 as in FIG. 9, or by some other means, is of no import with regard to the incorporation of full motion video window capability. Moreover, the technique of the system of FIG. 9 may be extended to allow for transparency in full motion video windows, even though the pixel data is retrieved from a source other than Frame Buffer Memory 22. In particular, the transparency data for a full motion video window may be based on the pixel data for the full motion video window itself, such as the data retrieved from an external MPEG chip.

In an alternative illustrative embodiment of the present invention, pixels in a first window may be made "translucent" rather than (fully) transparent. Specifically, a translucency parameter may be associated with each pixel in a corresponding manner, for example, as the transparency parameter (TransparencyFlag) is associated with each pixel in the system of FIG. 7. Such a system may also operate in an analogous manner to that of the system of FIG. 7 as described above. In the translucency case, however, as each translucent pixel is detected (i.e., as Priority Encoder 14 iterates through successively identified translucent pixels), the corresponding PixelData for the translucent pixel is stored in a memory rather than being ignored. Then, upon the detection of a non-translucent pixel, the stored pixel data for the translucent pixel(s) is "combined" with the PixelData for the non-translucent pixel to generate the data to be displayed. In this manner, the partial "see-through" effect of translucency may be achieved in the resultant display. Note that the feature of FIG. 8 which employs run length data to improve efficiency is not employed in the case of translucency, since the data to be displayed is advantageously generated from the pixel data of translucent pixels as well as non-translucent ones. Conventional techniques may be employed for combining pixel data to create the appearance of translucency on the display screen. For example, the displayed pixel value may be obtained by averaging grey scale values of monochrome pixels, or by mixing the colors of colored pixels.

The method of the present invention may be advantageously employed to efficiently recognize vadous conditions in the displayed image. For example, when the images of multiple objects are overlaid and moved about on a background scene, it may be useful for the controlling program to determine when two or more objects have "collided." if two balls are "bouncing" across the screen, for example, it may be desirable that their direction of motion be abruptly reversed when they collide. If each object's image is contained in a separate window, the program controlling the motion of the objects can be informed of such a condition by one illustrative embodiment of a display system according to the present invention.

In particular, the pixels in each object's window which immediately surround the border of the image of that object may be specially coded as transparent border pixels, as opposed to the other surrounding pixels which are coded as (merely) transparent pixels. This coding may be achieved, for example, with the use of an additional flag bit for each pixel (e.g., by using two bits instead of one to encode TransparencyFlag in Transparency Data Memory 64 of FIG. 7). Then, when a display system such as the one illustrated in FIG. 7 detects a transparent pixel at a given screen location, it is determined whether that pixel has been further coded as a transparent border pixel. If it has been coded as a transparent border pixel, the controlling program is apprised of a collision if the ultimately displayed pixel at that location is part of the image of another object (i.e., not a part of the background window). In this manner, the controlling program may readily determine when objects in the overall screen image have collided.

Another example of a condition in the displayed image which may be efficiently recognized by the method of the present invention is the detection of when a displayed cursor is pointing to a predetermined "hot spot." First, note that one illustrative application of a window-based display system with transparency according to the present invention includes the display of a movable cursor which overlays the image otherwise being displayed. For example, the cursor may be a small arrow or set of "cross-hairs" whose position is controlled by the user with an input device such as a joystick or a mouse. Specifically, such a cursor may be advantageously overlaid on the display by specifying a window containing the image of the cursor, coding the pixels in this window which surround the cursor image as transparent, and assigning this window the highest display priority. In this manner, the cursor image will overlay the rest of the displayed image, and the cursor may be readily moved about the screen by appropriately locating the cursor window.

Given such a cursor implementation, the method of the present invention may be further employed to efficiently recognize when the cursor is "pointing" to a predetermined area of interest, or "hot spot." In particular, the pixel contained in the cursor window which is located at or next to the cursor "point" (e.g., the point of the arrow or the intersection point of the cross-hairs) may be coded as a transparent cursor point pixel. In addition, pixels contained in other windows which are included in a predetermined area of interest may each be coded as a hot spot pixel. These codings may be achieved, for example, with the use of additional flag bits as described above. Then, a display system such as the one illustrated in FIG. 7 may be modified to incorporate hot spot detection in accordance with one embodiment of the present invention.

Specifically, when a transparent pixel is detected at a given screen location, the modified display system determines whether that pixel has been further coded as a transparent cursor point pixel. If it has been coded as a transparent cursor point pixel, the controlling program is apprised of a hot spot detection if the ultimately displayed pixel at that location has been coded as a hot spot pixel. In this manner, the controlling program may readily determine when the cursor is pointing to a hot spot.

In another embodiment of a display system modified to incorporate hot spot detection, the coding of the cursor point as a transparent cursor point pixel may be achieved in an alternate manner. Specifically, the pixel may be coded as a (merely) transparent pixel, and the display system may be further modified to recognize when the cursor point is located at the current screen location. For example, the cursor window may comprise a "northwest" pointing arrow such that the cursor point is the uppermost and left-most pixel in the window. Since the cursor window has been assigned as the window of highest priority, Window State Machine 12a may recognize that the cursor point is located at the current screen location by determining that Xstart= Xscreen and Ystart= Yscreen. In other words, the current screen location is the location of the cursor point when the current location is coincident with the upper left hand corner of the cursor window. Then, when the further modified display system determines that the current screen location is, in fact, the location of the cursor point, the controlling program is apprised of a hot spot detection if the ultimately displayed pixel at that location has been coded as a hot spot pixel.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

We claim:

1. An electronic circuit for generating a screen display, the screen display comprising a plurality of windows, the windows having been ordered in accordance with a predetermined display priority, each of said windows comprising a plurality of pixels, each pixel associated with a location in the screen display, the circuit comprising:

a plurality of circuit means for detecting whether a corresponding one of said windows includes a pixel associated with a given location in the screen display;

a plurality of transparency detector circuits, each transparency detector circuit electrically coupled to a corresponding one of said circuit means for detecting whether the corresponding window includes a pixel associated with the given location in the screen display, each of said transparency detector circuits operable to detect whether the pixel in the corresponding window associated with the given location in the screen display has been coded as a transparent pixel;

a priority encoder circuit electrically coupled to each of said transparency detector circuits, wherein the priority encoder circuit generates a signal representing one of said windows, said represented window having a higher display priority than any other of said windows which includes a pixel associated with the given location in the screen display which has not been coded as a transparent pixel; and a signal generating means, electrically coupled to said priority encoder circuit, for generating a signal representing the pixel in the represented window associated with the given location in the screen display.

2. The circuit in accordance with claim 1 wherein each of said circuit means for detecting whether the corresponding window includes a pixel associated with the given location in the screen display generates a corresponding signal representing whether the corresponding window includes a pixel associated with the given location in the screen display, and wherein each of said corresponding transparency detector circuits comprises means for inhibiting said corresponding signal when the pixel in the corresponding window associated with the given location in the screen display has been coded as a transparent pixel.

3. The circuit in accordance with claim 1 further comprising a memory electrically coupled to each of said transparency detector circuits, the memory comprising data representative of whether said pixel in the corresponding window associated with the given location in the screen display has been coded as a transparent pixel.

4. The circuit in accordance with claim 3 wherein said memory further comprises data representative of a number of successive pixels following said pixel in the corresponding window associated with the given location in the screen display which have been coded as transparent pixels, when said pixel in the corresponding window associated with the given location in the screen display has been coded as a transparent pixel.

5. The circuit in accordance with claim 3 wherein said memory further comprises data representative of whether said pixel in the corresponding window associated with the given location in the screen display has been coded as a transparent border pixel.

6. The circuit in accordance with claim 3 wherein said memory further comprises data representative of whether said pixel in the corresponding window associated with the given location in the screen display has been coded as a transparent cursor point pixel.

7. The circuit in accordance with claim 1 wherein each of said transparency detector circuits is responsive to said signal representing the pixel in the represented window associated with the given location in the screen display, and wherein a predetermined value of said signal represents that said pixel in the corresponding window associated with the given location in the screen display has been coded as a transparent pixel.

8. The circuit in accordance with claim 1 wherein at least one of said windows comprises an image from full motion video.

9. The circuit in accordance with claim 8 further comprising a second priority encoder circuit electrically coupled to each of said transparency detector circuits, wherein the second priority encoder circuit generates a signal representing one of said windows comprising an image from full motion video, said represented window comprising an image from full motion video having a higher display priority than any other of said windows comprising an image from full motion video which includes a pixel associated with the given location in the screen display which has not been coded as a transparent pixel.

10. An electronic circuit for generating a screen display, the screen display comprising a plurality of windows, the windows having been ordered in accordance with a predetermined display priority, each of said windows comprising a plurality of pixels, each pixel associated with a location in the screen display, the circuit comprising:

a plurality of circuit means for detecting whether a corresponding one of said windows includes a pixel associated with a given location in the screen display;

a plurality of translucency detector circuits, each translucency detector circuit electrically coupled to a corresponding one of said circuit means for detecting whether the corresponding window includes a pixel associated with the given location in the screen display, each of said translucency detector circuits operable to detect whether the pixel in the corresponding window associated with the given location in the screen display has been coded as a translucent pixel;

a priority encoder circuit electrically coupled to each of said translucency detector circuits, wherein the priority encoder circuit generates a signal representing one of said windows, said represented window having a higher display priority than any other of said windows which includes a pixel associated with the given location in the screen display which has not been coded as a translucent pixel; and a signal generating means, electrically coupled to said priority encoder circuit, for generating a signal representing a combination of the pixel in the represented window associated with the given location in the screen display and the pixel in a window having a higher display priority than the represented window associated with the given location in the screen display.

11. The circuit in accordance with claim 10 wherein each of said circuit means for detecting whether the corresponding window includes a pixel associated with the given location in the screen display generates a corresponding signal representing whether the corresponding window includes a pixel associated with the given location in the screen display, and wherein each of said corresponding translucency detector circuits comprises means for inhibiting said corresponding signal when the pixel in the corresponding window associated with the given location in the screen display has been coded as a translucent pixel.

12. The circuit in accordance with claim 10 further comprising a memory electrically coupled to each of said translucency detector circuits, the memory comprising data representative of whether said pixel in the corresponding window associated with the given location in the screen display has been coded as a translucent pixel.

13. The circuit in accordance with claim 10 wherein at least one of said windows comprises an image from full motion video.

* * * * *